(12) United States Patent
Cheon

(10) Patent No.: US 6,484,016 B1
(45) Date of Patent: Nov. 19, 2002

(54) DEVICE FOR CONNECTING A MAIN BOARD WITH AN LCD MODULE IN A FOLDER TYPE PORTABLE RADIOTELEPHONE

(75) Inventor: Eon-Seog Cheon, Kyongsangbuk-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/467,440

(22) Filed: Dec. 20, 1999

(30) Foreign Application Priority Data

Dec. 30, 1998 (KR) ............................................. 98-60998

(51) Int. Cl.[7] ............................. H04B 1/38; H04M 1/03
(52) U.S. Cl. ..................... 455/90; 455/348; 379/433.13; 16/386
(58) Field of Search ........................... 455/90, 575, 128, 455/550, 557, 347–351; 379/433.05, 433.13; 16/386; 439/165, 31; 361/789, 681

(56) References Cited

U.S. PATENT DOCUMENTS

| | | | |
|---|---|---|---|
| 5,681,176 A | * | 10/1997 | Ibaraki et al. ............... 439/165 |
| 5,832,080 A | * | 11/1998 | Beutler et al. ................. 16/342 |
| 6,088,240 A | * | 7/2000 | Steinhoff et al. .............. 455/90 |
| 6,091,938 A | * | 7/2000 | Go ................................ 455/90 |
| 6,292,980 B1 | * | 9/2001 | Yi et al. ...................... 379/433 |
| 6,300,910 B1 | * | 10/2001 | Kim ............................ 343/702 |

FOREIGN PATENT DOCUMENTS

| | | | |
|---|---|---|---|
| EP | 0897236 | * | 2/1999 |
| GB | 2328343 | * | 2/1999 |

* cited by examiner

Primary Examiner—Vivian Chin
Assistant Examiner—Eliseo Ramos-Feliciano
(74) Attorney, Agent, or Firm—Dilworth & Barrese, LLP

(57) ABSTRACT

A device for connecting a main board with an LCD module in a folder type portable radiotelephone which includes a body element having the main board, a folder having a speaker unit, the LCD module and a hinge arm, and a hinge disposed in the hinge arm for mechanically coupling the body element and the folder with each other such that the folder can be rotated at one end of the body element. The folder further includes a flexible printed circuit connected to a speaker unit and the LCD module. The device further comprises a first connector connected to the flexible printed circuit of the folder; a second connector which is connected to the first connector; a first hinge connector positioned in the hinge arm; a first electrical connection connecting the second connector and the first hinge connector; a third connector installed in the main board of the body element; a fourth connector which is connected to the third connector; and second hinge connector connected to the fourth connector by a second electrical connection, the second hinge connector further connected to the first hinge connector in the axial direction thereby connecting the main board with the flexible printed circuit.

7 Claims, 7 Drawing Sheets

DEVICE FOR CONNECTING A MAIN BOARD WITH AN LCD MODULE IN A FOLDER TYPE PORTABLE RADIOTELEPHONE

BACKGROUND OF THE INVENTION

1. Field of the Invention

The present invention relates to a folder type portable radiotelephone, and more particularly, the present invention relates to a device for connecting an LCD module installed in a folder to a main board installed in a body element.

2. Description of the Related Art

Generally, portable radiotelephones refer to analog type or digital type cellular phones, personal communication system (PCS) phones, etc. Such portable radiotelephones perform a communication function by conducting radio communication with a base station. In other words, portable radiotelephones have a main purpose of transmitting communication signals. In this setting, a communication system refers to a system in which communication signals are transmitted between a portable radiotelephone, a base station, a mobile telephone exchange and a public radio wave network link.

Developments in electronics have improved such portable radiotelephones by providing a high sensitivity and a reduction in size and weight. Portable radiotelephones can be classified in terms of external construction, such as a bar type construction, a flip type construction and a folder type construction. Flip type portable radiotelephones and folder type portable radiotelephones are now widely used. In the future, the use of the folder type portable radiotelephones or portable terminals having more compact construction will increase.

Use of flip type portable radiotelephones is currently increasing because a flip serves to shield the phone's keys when closed, thereby preventing erroneous operations of those keys. The flip also serves as a reflecting plate when open, thereby concentrating the user's speech into the microphone and enhancing the sound sensitivity level. In addition, when a microphone unit is installed in the flip, the body can be made more compact.

Use of folder type portable radiotelephones is currently increasing for similar reasons. A folder coupled to a body element serves to protect a keypad on the body when closed, thereby preventing erroneous operations of a multitude of keys. The folder also serves as a reflecting plate when open, thereby concentrating the user's speech into the microphone and enhancing the sound sensitivity level. In addition, a speaker unit and an LCD module can be installed in the folder, thus making the body more compact.

Referring to FIGS. 1 and 2, a conventional folder type portable radiotelephone is shown, wherein FIG. 1 depicts the folder type portable radiotelephone closed and FIG. 2 depicts the folder type portable radiotelephone open.

The conventional folder type portable radiotelephone comprises a body 10, a folder 20, and hinge means for rotatably connecting the body 10 with the folder 20. The folder 20 is opened and closed about axis A. An earpiece 210 including a speaker unit 211 and an LCD module 30 are mounted in the folder 20, and a keypad 40 including a plurality of keys and an antenna unit 110 are installed in the body 10. Data is input using the keypad 40, and radio communication signals are received by the antenna unit 110. A microphone 50 is positioned at a lower end of the body 10.

The folder 20 is connected to the body 10 by the hinge means, namely a pair of side arms 101 formed at opposite sides of the upper end of the body 10, and a hinge arm 201 formed at the lower end of the folder 20.

FIG. 3 shows a main board 120 arranged within the body element 10. Because the LCD module 30 is mounted to the folder 20, an electrical connection must be provided between the main board 120 and the LCD module through the hinge.

The electrical connection for electrically connecting the LCD module 30 and the main board 120 comprises a flexible printed circuit 213 and connectors 214 and 122. The speaker unit 211, a vibration motor 212 and the LCD module 30 are electrically connected to the flexible printed circuit 213. An extended part 213a of the flexible printed circuit 213 passes through the hinge arm and a side arm and is electrically connected to the main board 120.

A first connector 214 is attached to the end of extended part 213a and is coupled to a second connector 122 on the main board 120, thus electrically connecting the LCD module 30 and the main board 120.

FIG. 4 shows additional details of the electrical connection between the LCD module 30 and the main board 120. The folder 20 is rotated at the upper end of the body element 10 through the hinge means and is thereby opened at an angle for communication. The hinge arm 201 and a hinge extension 201a are formed at the lower end of the folder 20, and the pair of side arms 101 are formed at the upper end of the body element 10. The sidearms 101 and the hinge extensions 201a (on opposite ends of the hinge arm 201) interface to form a hinge. Because the hinge extension 201a has a cylindrical cross-section, a hole 202a in the hinge extension 201a passes the extended part 213a of the flexible printed circuit 213. After passing through the hinge extension 201a, the extended part 213a is electrically connected to the body element 10 by connectors 214 and 122.

By using the flexible printed circuit 213 and the connectors 214 and 122 for electrically connecting the LCD module 30 in the folder 20 to the main board 120 of the body 10, the conventional folder type portable radiotelephone suffers from the following problems.

When considered from a manufacturing and assembly standpoint, coupling the body element 10 with the folder 20 is difficult. Connecting the extended part 213a of the flexible printed circuit 213 to the main board 120 of the body element 10 must be carefully implemented. An assembler must insert the free end of the extended part 213a of the flexible printed circuit 213 into the side arm 101, direct the free end of the extended part 213a toward the main board 120 of the body element 10, and then couple the first and second connectors 214 and 122. This is a complex procedure and the extended part 213a of the flexible printed circuit 213 can be bent, broken or damaged by this manipulation. Thus, the defect rate is increased.

Also, when the folder 20 is opened or closed, the opening force or closing force of the folder 20 can damage the extended part 213a of the flexible printed circuit 213.

SUMMARY OF THE INVENTION

Accordingly, the present invention has been made in an effort to solve the problems occurring in the related art, and a primary object of the present invention is to provide a device for connecting an LCD module and a main board with each other in a folder type portable radiotelephone which facilitates its manufacture and assembly.

Still another object of the present invention is to provide a device for connecting an LCD module and a main board with each other in a folder type portable radiotelephone, the device being disposed in a hinge shaft so that it is not damaged by the rotating movement of a folder when the folder is opened or closed to and from the body element, respectively.

In order to achieve the above object, according to the present invention, there is provided a device for connecting a main board with an LCD module in a folder type portable radiotelephone which includes a body element having the main board, a folder having a speaker unit, the LCD module panel and a hinge arm, and a hinge interfacing with the hinge arm and the body element for mechanically coupling the body element and the folder with each other. The folder can be rotated at one end of the body element about an axis between a closed (or folded) position to an angle capable of rendering communication. The folder also includes a flexible printed circuit connected to the speaker unit and the LCD module. The device further comprises a first connector connected to the flexible printed circuit of the folder; a second connector which is connected to the first connector; a first hinge connector positioned in the hinge arm; a first electrical connection connecting the second connector and the first hinge connector; a third connector installed in the main board of the body element; a fourth connector which is connected to the third connector; and a second hinge connector connected to the fourth connector by a second electrical connection, the second hinge connector further connected to the first hinge connector in the axial direction thereby connecting the main board with the flexible printed circuit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT

Figure 1:
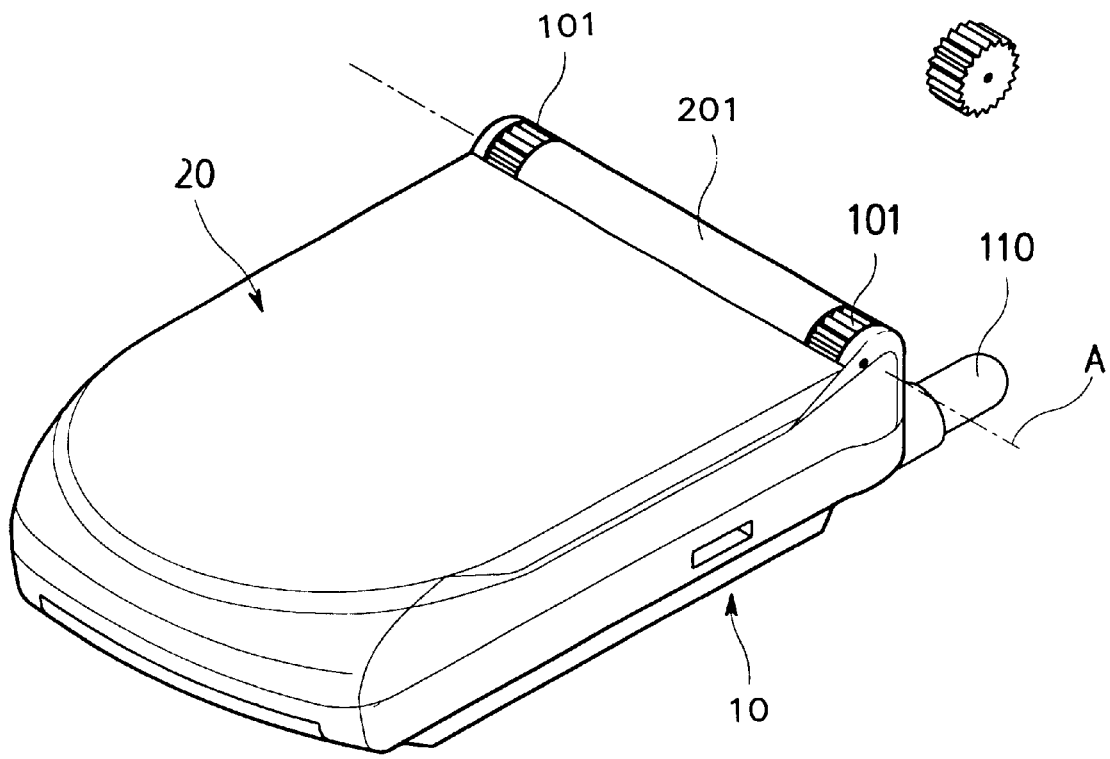
FIG. 1 is a perspective view illustrating a folder type portable radiotelephone according to the conventional art, shown in a closed position.
Figure 2:
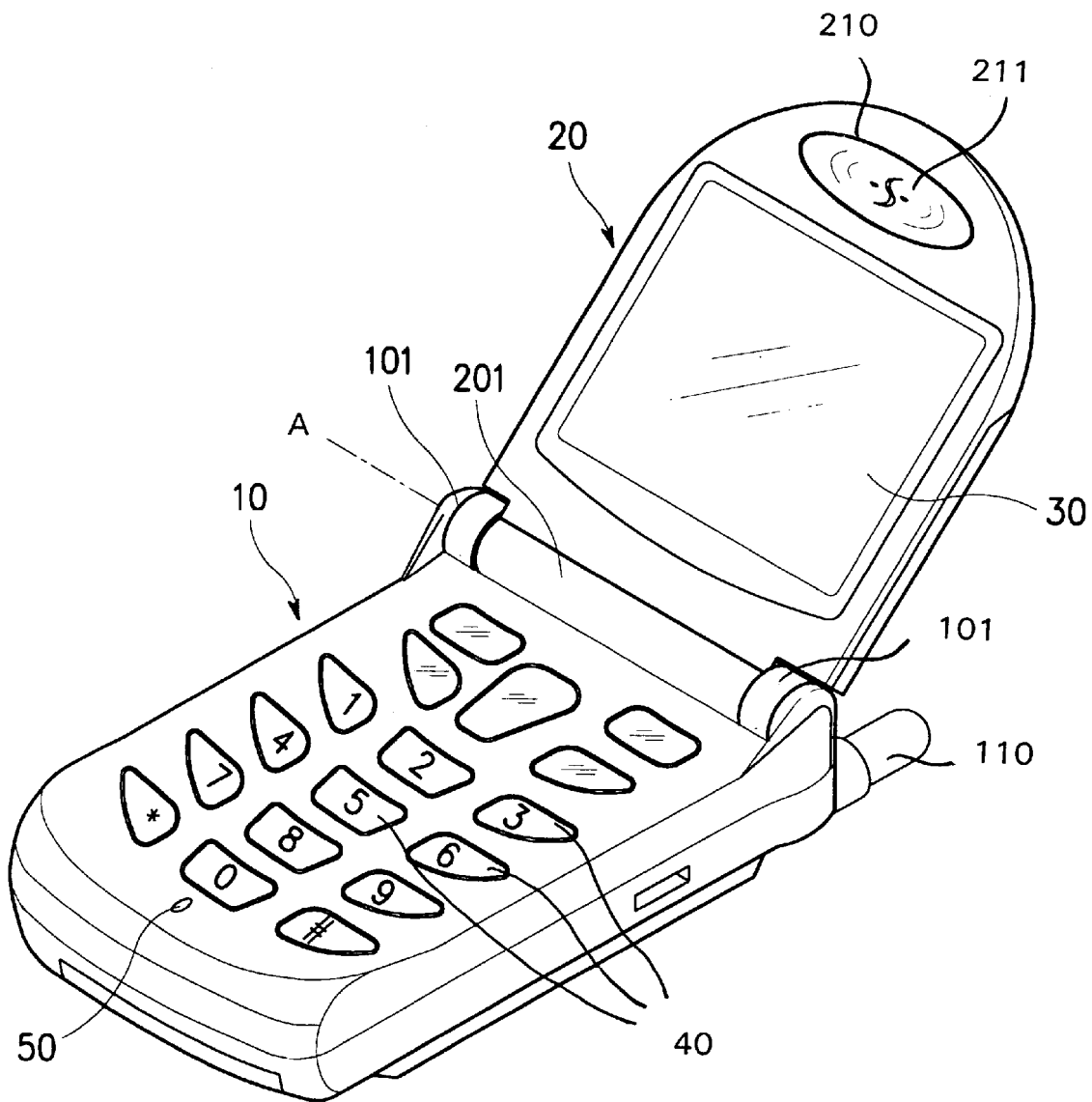
FIG. 2 is a perspective view illustrating the folder type portable radiotelephone according to the conventional art, shown in an open position.

Reference will now be made in greater detail to the preferred embodiments of the present invention. The same or similar elements are denoted by the same reference numerals in the drawings. In the following description of the present invention, a detailed description of known functions and structure that is incidental to the present invention is omitted.

Figure 5:
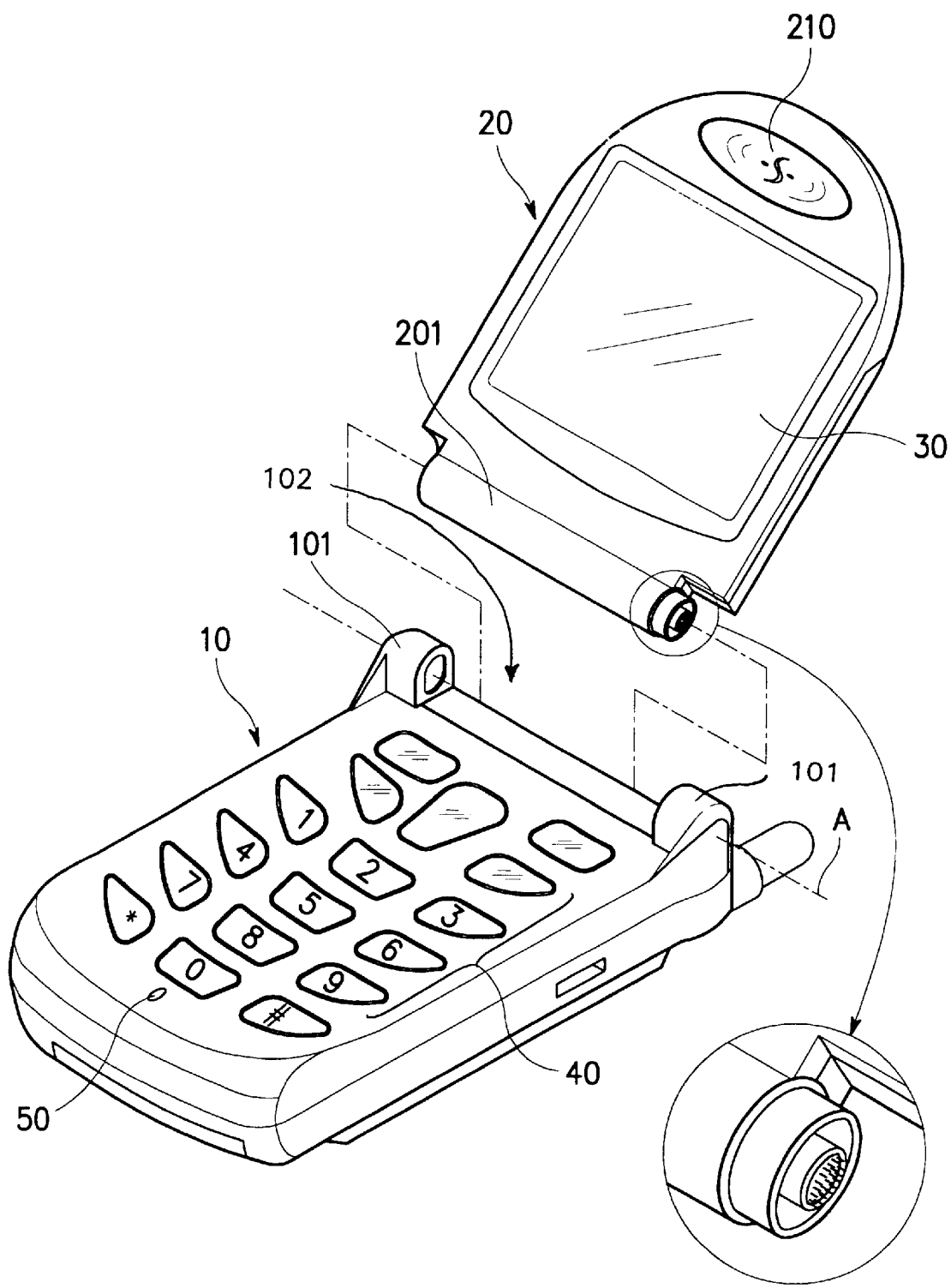
FIG. 5 is an exploded perspective view illustrating an embodiment of a folder type portable radiotelephone in accordance with an embodiment of the present invention.

FIG. 5 is an exploded perspective view illustrating a folder type portable radiotelephone of the present invention. Folder type portable radiotelephone comprises a body element 10, a folder 20, and hinge for allowing the folder 20 to be opened about an upper end of the body element 10 to a predetermined angle for operating the phone. Accordingly, the folder 20 is rotated from the body element 10 about a rotating axis A. The folder 20 is rotated at the upper end of the body element 10 by about 160° with respect to the body, thus establishing a "communication distance". Here, the phrase "communication distance" means a distance between an earpiece 210 and a microphone unit 50. The phrase "communication distance" corresponds to the nominal distance between the ear and the mouth of a user.

The body element 10 has a pair of side arms 101 which are opposite to each other, and a slot 102 is defined between the pair of side arms 101. Also, a keypad 40 including at least one key is arranged below the pair of side arms 101 on the body element 10, and the microphone unit 50 is disposed below the keypad 40.

The folder 20 has a hinge arm 201 inside which standard hinge hardware is received. The hinge arm 201 is assembled to the body element 10 by engagement of the hinge hardware after being inserted in the slot 102 between the pair of side arms 101. The earpiece 210 including a speaker is positioned at the upper end of the folder 20, and an LCD module 30 on which a variety of information is displayed, is arranged within the folder 20 below the earpiece 210.

If data is input by the user via keypad 40, the data is also displayed on the LCD module 30 to allow the user to confirm the displayed data.

Connecting the LCD module 30 in the folder 20 to the main board 120 in the body element 10 according to the embodiment of the present invention is as follows. In the following description, the term "connector" is used to generally refer to electrical connection from a flexible printed circuit (similar to that shown as element 213 in FIG. 3) connected with the LCD module 30, a vibration motor and the speaker unit which are disposed in the folder 20, to the main board (similar to that shown as element 120 in FIG. 3) which is positioned in the body element 10. The electrical connection of the connector is made via a hinge shaft connecting the folder 20 and the body element 10, thus allowing signals to be transmitted between the flexible printed circuit 213 and the main board 120. Mounting structures of the vibration motor and the speaker unit are illustrated in FIG. 3.

Figure 6:
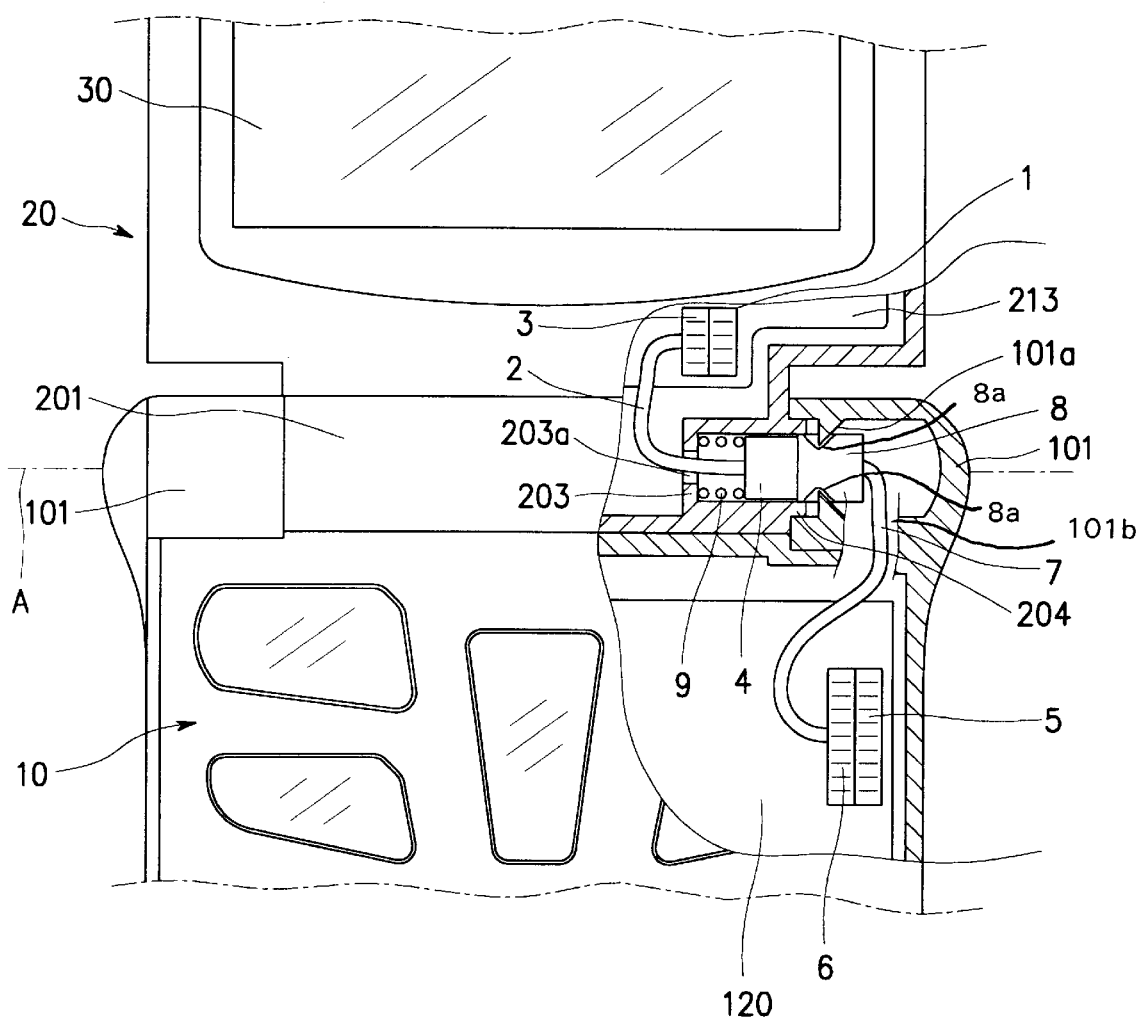
FIG. 6 is a partial cross-sectional plan view illustrating details for connecting a main board and an LCD module with each other for the radiotelephone shown in FIG. 5.
Figure 7:
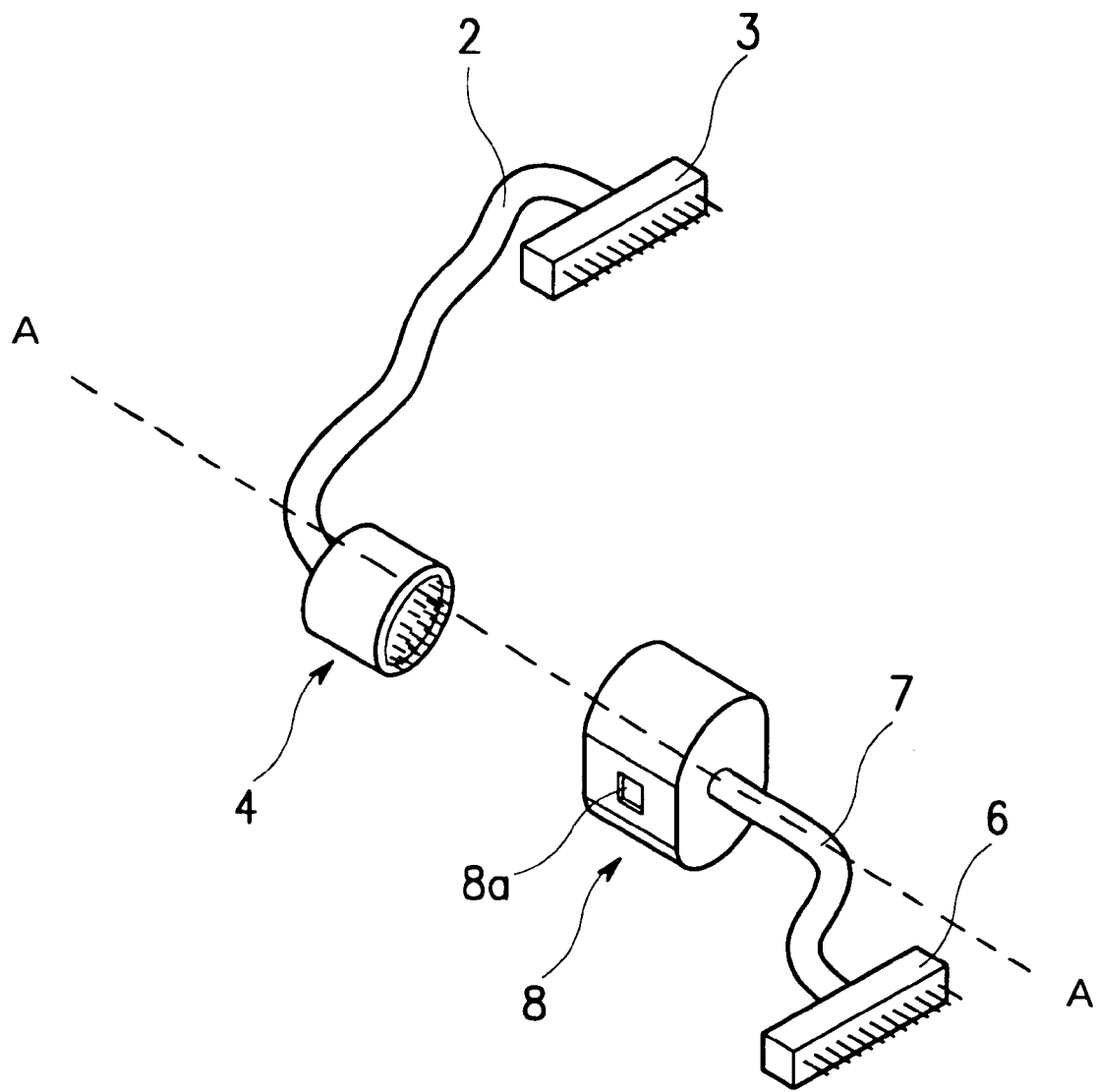
FIG. 7 is a perspective view illustrating first and second hinge connectors for connecting the main board and LCD module shown in FIGS. 5 and 6.

Referring to FIGS. 6 and 7, the folder 20 is coupled to the body element 10 along rotating axis A, the hinge arm 201 of the folder 20 being positioned in the slot 102 which is defined between the pair of side arms 101. Thus, the pair of side arms 101 and the hinge arm 201 are coaxially aligned one with another.

Figure 3:
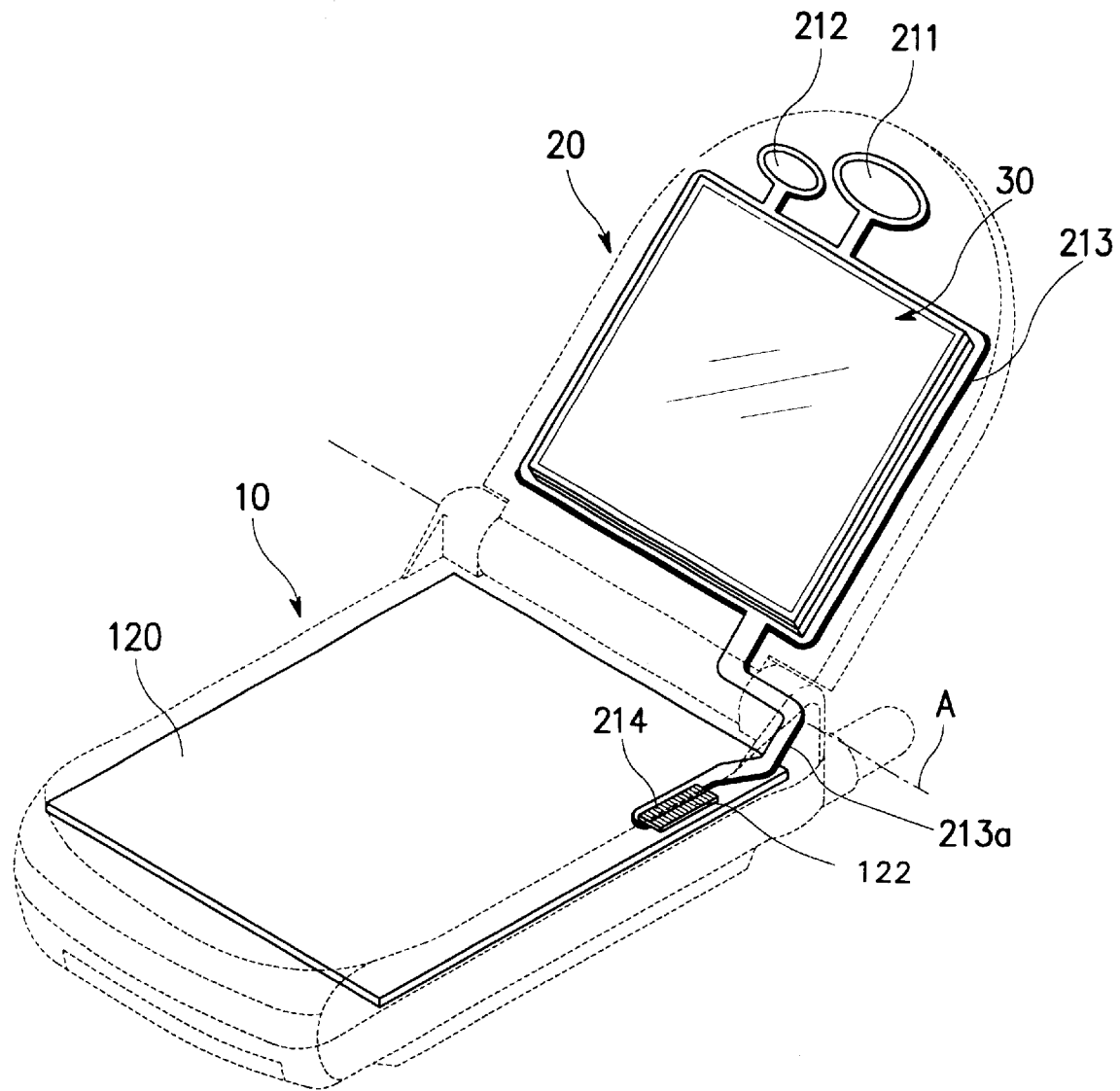
FIG. 3 is a perspective view of main components of a folder type portable phone as in FIGS. 1 and 2, illustrating a main board and an LCD module connected with each other.
Figure 4:
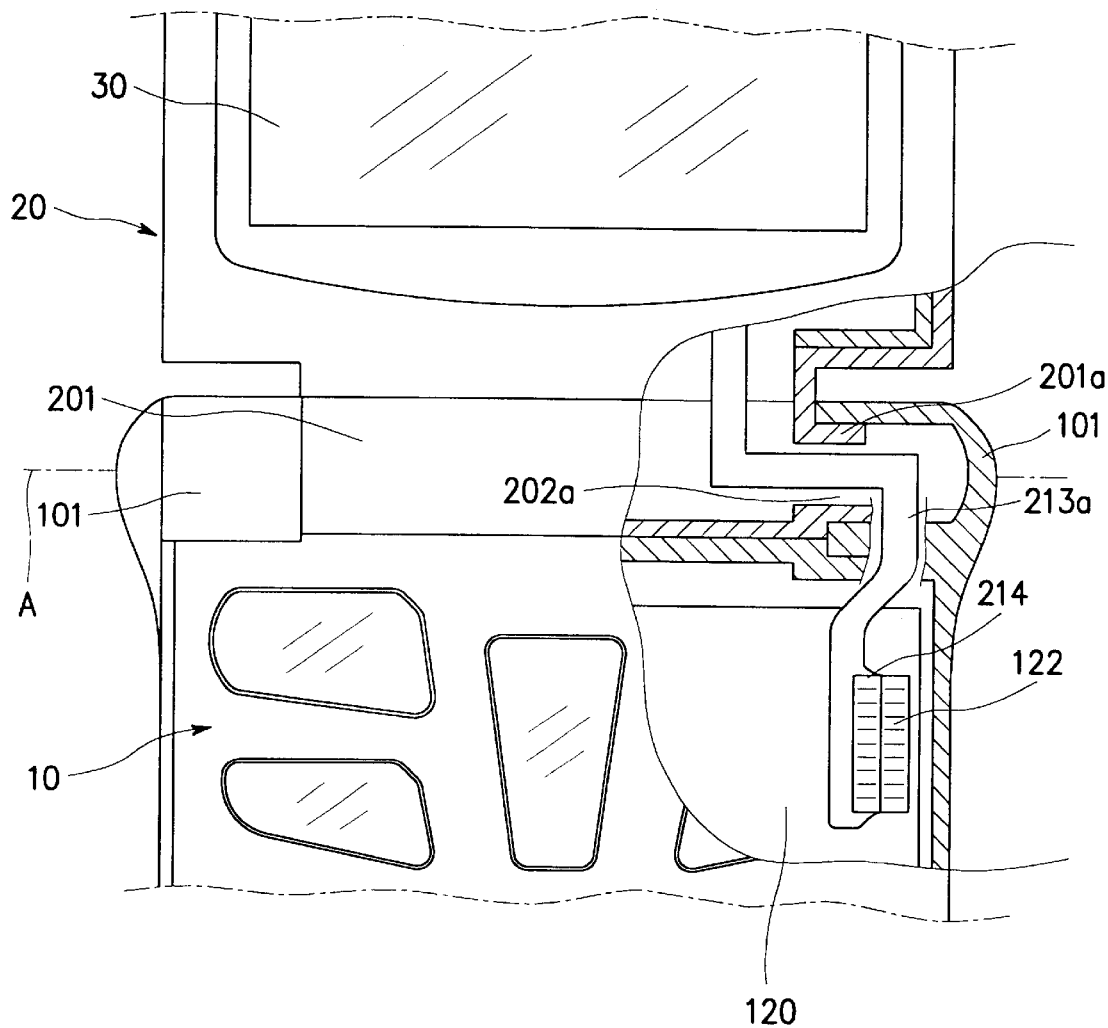
FIG. 4 is a partially broken-away plan view of a folder type portable phone as in FIGS. 1 and 2 illustrating the details of how the main board and the LCD module are connected with each other.

The body element 10 includes the main board 120, and the folder 20 includes the flexible printed circuit 213 which is connected with the speaker unit, the vibration motor, and the LCD module 30 in the manner shown in FIG. 3 and described above. It does not include the extended part 213a shown in FIG. 3.

A first connector 1 is attached at a lower right-hand position on the flexible printed circuit 213. A first hinge connector 4 is positioned in the hinge arm 201. A second connector 3 interfaces with first connector 1. Second connector 3 and first hinge connector 4 are connected with each other by first electrical connection 2. It is preferred that the first electrical connection 2 comprises a cable. The first hinge connector 4 is supported by a coil spring 9 which inn turn is supported by a wall portion 203 of the hinge arm 201. The cable 2 extends from the first hinge connector 4 into the folder 20 through a hole 203a which is formed in the wall portion 203.

A third connector 5 is attached to the main board 120 within the body element 10. A second hinge connector 8 is positioned in the side arm 101 of the body element 10. A fourth connector 6 interfaces with the third connector 5. Fourth connector 6 and the second hinge connector 8 are connected with each other by second electrical connection 7. It is preferred that the second electrical connection 7 comprises a cable. Cable 7 passes through opening 101b in side arm 101.

The hinge arm 201 has a hinge extension 204 which extends around the rotating axis A. The coil spring 9 and the first hinge connector 4 are disposed in the hinge extension 204, and the second hinge connector 8 is axially arranged in the side arm 101. Accordingly, the first hinge connector 4 and the second hinge connector 8 are coupled with each other in the direction of the rotating axis A. The diameter of the first hinge connector 4 is slightly less than that of the opening defined within the hinge extension 204. This allows the folder 20 to be rotated between an opened and closed position with respect to the body element 10 without interference between the first hinge connector 4 and the hinge extension 204.

Moreover, the second hinge connector 8 separately engages the side arm 101. The engagement comprises a pair of engaging projections 101a which are formed on an inner surface of the side arm 101 and a pair of engaging grooves 8a which are formed on opposite flat side surfaces of the second hinge connector 8.

Thus, if data is input using the keys 40, for example, a variety of signals are transmitted from the main board 120 to the LCD module 30 through the third connector 5, the fourth connector 6, the second electrical connection 7, the second hinge connector 8, the first hinge connector 4, the first electrical connection 2, the second connector 3 and the first connector 1.

In the connector of the present invention, since the first and second hinge connectors 4 and 8 are coupled with each other in the direction of the rotating axis A, the rotating force of the folder 20 about the axis-has no impact on the coupling between the first and second hinge connectors 4 and 8. Further, the force exerted by the spring 9 on the first hinge connector 4 and the force exerted by the grooves 8a on second hinge connector 8 maintain the first and second hinge connectors 4, 8 connected along the A axis. Thus, the first and second hinge connectors 4 and 8 remain connected even when the folder 20 is repeatedly opened and closed.

When assembling the connector as described above, the coil spring 9 and the first hinge connector 4 are inserted into the hinge arm 201, and then, the second connector 3 is attached to the opposite end of the cable 2 and connected to the first connector 1. The second hinge connector 8 engages the side arm 101 of the body element 10, and the fourth connector 6 which is installed to one end of the cable 7 is connected to the third connector 5 of the main board 120.

Thereafter, in the process of coupling the folder 20 to the body element 10, hinge extension 204 of hinge arm 201 is partially received in side arm 101, in front of projections 101a. In so doing, the first hinge connector 4 is pushed inward into the opening against the spring 9. Next, if the force applied to the first hinge connector 4 is removed as the hinge extension 204 is received in side arm 101 and after the first and second hinge connectors 4 and 8 are coaxially aligned with each other, the first and second hinge connectors 4 and 8 are connected with each other by the elastic force of the coil spring 9. As noted above, once connected, the spring force maintains the connection.

The first hinge connector 4 does not interfere with the folder 20 when the folder 20 is rotated about the rotating axis A. In addition, once the first and second hinge connectors 4 and 8 are connected, they form a unified hinge pin between the hinge extension 204 and the side arm 101.

It should be noted that the connector of the present invention may be used in other apparatus apart from a folder type portable radiotelephone. There are other apparatus which require connecting a main board in a body element with an LCD module in a folder. Therefore, persons skilled in the art will appreciate that the connector of the present invention can also be applied in the same way to a flip type portable radiotelephone, a folder type terminal of a compact size including the folder type portable radiotelephone, the connection between a notebook computer and its screen, etc. The present invention is also not limited to connecting a main board with an LCD, but can be generally applied to connecting two electronic components through a hinge mechanism.

Furthermore, it is not necessary to limit the first and second electrical connection 2 and 7 to a cable, and each of the first and second electrical connection means can comprise a flexible printed circuit.

While this invention has been described in connection with what is presently considered to be the most practical and preferred embodiment, it is to be understood that the invention is not limited to the disclosed embodiment, but, on the contrary, is intended to cover various modifications within the spirit and scope of the appended claims.

What is claimed is:

1. A device for connecting a main board with an LCD module in a folder type portable radiotelephone which includes a body element having the main board, a folder having a speaker unit, the LCD module and a hinge arm, and a hinge interfacing with the hinge arm and the body element for mechanically coupling the body element and the folder with each other such that the folder can be rotated through an angle at one end of the body element about an axis, the folder further having a flexible printed circuit connected to the speaker unit and the LCD module, the device comprising:

a first connector connected to the flexible printed circuit of the folder;

a second connector which is connected to the first connector;

a first hinge connector positioned in the hinge arm;

a first electrical connection connecting the second connector and the first hinge connector;

a third connector installed in the main board of the body element;

a fourth connector which is connected to the third connector;

a second hinge connector that engages the main body and is connected to the fourth connector by a second electrical connection, the second hinge connector further connected to the first hinge connector in the direction of the axis, thereby connecting the main board with the flexible printed circuit.

2. The device as claimed in claim 1, further comprising:

an elastic member interfacing with the hinge arm and providing a force on the first hinge connector, thereby maintaining a connection force between the first hinge connector and the second hinge connector in the direction of the axis.

3. The device as claimed in claim 2, wherein the elastic member comprises a spring.

4. The device as claimed in claim 1, wherein each of the first and second electrical connection each comprise a cable.

5. The device as claimed in claim 1, wherein the hinge is cylindrical.

6. The device as claimed in claim 1, further comprising:

a stop for restraining movement of the second hinge connector with respect to the body element in the direction of the axis.

7. The device as claimed in claim 6, wherein the stop comprises:

a pair of engaging grooves which are defined at opposite side surfaces of the second hinge connector; and a pair of engaging projections which are formed in the body element that are received in the pair of engaging grooves.

* * * * *